US006637448B2

(12) United States Patent
Naab et al.

(10) Patent No.: US 6,637,448 B2
(45) Date of Patent: Oct. 28, 2003

(54) CONTAMINATION-FREE PYROVALVE

(75) Inventors: Carlton William Naab, Safety Harbor, FL (US); Paul Grant Schamell, Bradenton, FL (US)

(73) Assignee: Conax Florida Corporation, St. Petersburg, FL (US)

(*) Notice: Subject to any disclaimer, the term of this patent is extended or adjusted under 35 U.S.C. 154(b) by 0 days.

(21) Appl. No.: 09/809,886

(22) Filed: Mar. 16, 2001

(65) Prior Publication Data

US 2002/0129695 A1 Sep. 19, 2002

(51) Int. Cl.[7] ................................................ F16K 31/02

(52) U.S. Cl. .......................... 137/1; 137/68.13; 137/70; 251/251; 251/77

(58) Field of Search ................................ 137/68.13, 70, 137/1; 251/76, 77; 220/261; 280/737, 742

(56) References Cited

U.S. PATENT DOCUMENTS 3,141,470 A * 7/1964 La Fontaine ............. 137/68.13
3,474,809 A * 10/1969 Gordon ....................... 137/70
3,494,370 A * 2/1970 Wahl et al. .............. 137/68.13
3,548,848 A * 12/1970 Stichling ................. 137/68.13
4,003,395 A * 1/1977 Tyler ........................ 137/68.13
4,579,136 A * 4/1986 Oman et al. ............. 137/68.13
4,619,284 A * 10/1986 Delarue et al. ............... 137/67
5,154,876 A * 10/1992 Ehrke et al. ................ 376/282

* cited by examiner

*Primary Examiner*—Michael Powell Buiz
*Assistant Examiner*—Ramesh Krishnamurthy
(74) *Attorney, Agent, or Firm*—Hodgson Russ LLP

(57) ABSTRACT

A contamination-free pyrovalve having first tubing section and a second tubing section. The first and second tubing sections are disposed in spaced-apart relation such that a conveying path between the first and second tubing section is established. An opening is disposed between the first and second tubing sections. A valve body is fixedly attached to the first and second tubing sections. The valve body has a bore. A ram is disposed inside the bore of the valve body. A slug is disposed in the opening between the first tubing section and the second tubing section. The slug is held in position by a frictional fit. A combustion chamber is disposed in operative relation to the ram such that when an explosive material is ignited the pressure inside the chamber causes the ram to move through the bore to strike the slug and to displace it from the opening between the first and second tubing sections such that the valve is opened.

19 Claims, 7 Drawing Sheets

CONTAMINATION-FREE PYROVALVE

FIELD OF THE INVENTION

The present invention relates generally to pyrovalves, and specifically to a contamination free pyrovalve.

BACKGROUND OF THE INVENTION

An example of a known pyrovalve is shown in FIG. 1 in cross-section. A shear section 10 provides for opening a valve 13. As known to those of ordinary skill in the art, a section of pipe 16 is machined with a slug 22 disposed there between such that the valve 13 is normally closed. As shown in FIG. 1, the shear section 10 is typically a one-piece machined assembly. The slug 22 is positioned such that the downward force of a ram 25 causes reduced width sections 28 to fracture such that the slug 22 is capable of translatory motion in the direction of the ram 25. The ram 25 is propelled downward by means of an explosive as known to those of ordinary skill in the art. The force of the ram 25 propels the slug 22 downward onto a projection 31 such that the slug 22 clears the two sections of pipe 16, 19 and the valve 13 is opened. When these types of valves are activated, fine metal particles that are produced by the shearing of the metal may enter the pipes.

Accordingly, what is needed is a contamination-free pyrovalve that does not require the shearing of metal and therefore reduces the likelihood of producing fine metal particles.

SUMMARY OF THE INVENTION

The present invention meets the above-described need by providing a contamination free pyrovalve. The present invention provides a valve having a slug that is press fit into position to establish a normally closed valve. By having the slug pressed into position, there is less of a chance for shearing of metal when the ram dislodges the slug to open the valve.

The present invention comprises a contamination-free pyrovalve having first tubing section and a second tubing section. The first and second tubing sections are disposed in spaced-apart relation such that a conveying path between the first and second tubing section is established. An opening is disposed between the first and second tubing sections. A valve body is fixedly attached to the first and second tubing sections. The valve body has a bore. A ram is disposed inside the bore of the valve body.

A slug is disposed in the opening between the first tubing section and the second tubing section. The slug is held in position by a frictional fit.

A combustion chamber is disposed in operative relation to the ram such that when an explosive material is ignited the pressure inside the chamber causes the ram to move through the bore to strike the slug and to displace it from the opening between the first and second tubing sections such that the valve is opened.

The valve of the present invention may also include a deceleration post that engages with a bore disposed in the slug.

DETAILED DESCRIPTION OF THE PREFERRED EMBODIMENT

Figure 2:
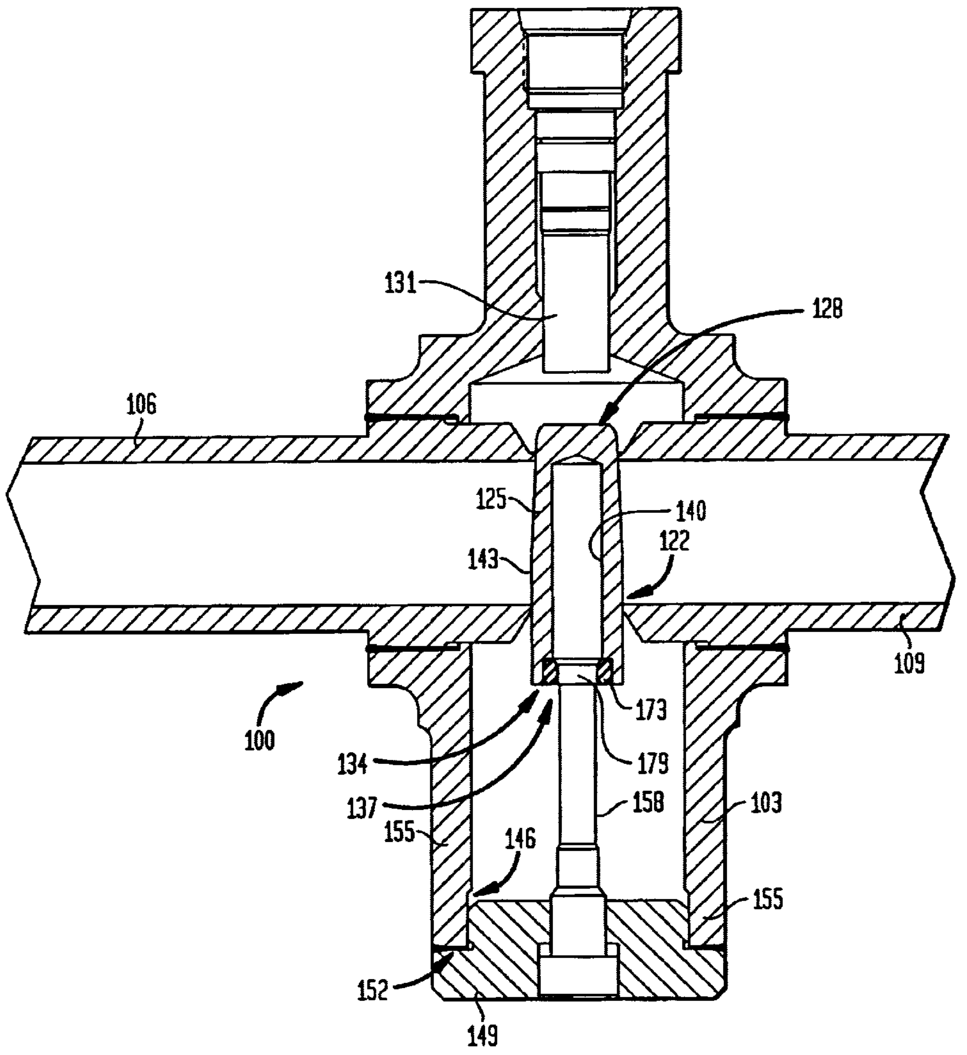
FIG. 2 is a cross-sectional, side elevation view of the pyrovalve of the present invention prior to ignition of the explosive substance.

Referring to FIGS. 2–7 generally and initially to FIG. 2, a contamination-free pyrovalve 100 of the present invention includes a valve body 103 that connects a first tubing section 106 to a second tubing section 109. The valve 100 in FIG. 2 is shown in its pre-firing position. The tubing sections 106, 109 are constructed of a tubing suitable for welding and in some applications may include stainless steel. The valve body 103 is fixedly attached to the tubing sections 106, 109 by welding. Other means for fixedly attaching the valve body 103 is to the tubing sections 106 and 109 may also be suitable such as by fasteners, adhesives and the like. The attachment of the valve body 103 to the tubing sections 106 and 109 may or may not be permanent. The valve body 103 holds the tubing sections 106 and 109 in spaced-apart relation to form an opening 122 between the tubing sections 106, 109. The tubing sections 106 and 109 are disposed in alignment such that a conveying path is established there between. The valve body 103 holds the tubing section 106 and 109 in spaced apart relation with sufficient strength such that a slug 125 can be press fit into the opening 122.

The slug 125 has a first end 128 that is shaped for receiving the ram 131. The first end 128 has a substantially flat surface in order to distribute the force of the ram over a larger area. At the opposite end 134 of the slug 125, an opening 137 leads to an internal bore 140.

The outer wall 143 of the slug 125 is tapered at a gradual angle such that the slug 125 is capable of being press fit into opening 122 such that the valve 110 is normally closed by the frictional engagement of the slug 125 inside the opening. The dimensions of opening 122 are designed to provide a press fit engagement with the slug 125 as known to those of ordinary skill in the art.

The slug 125 is installed through an opening 146 in the bottom of the valve body 103. The slug 125 is press fit into the opening 122 by a mechanical method at pressures known to those of ordinary skill in the art. After the slug 125 is installed in the opening 122, a plug 149 is attached to the bottom of the valve body 103 by welding fasteners or the like. As shown, the plug 149 includes a shoulder 152 that engages with the walls 155 of the valve body 113. The plug 149 may be welded to the valve body 103 as shown.

The plug 149 lid supports a deceleration post 158 which will be described in greater detail hereafter.

Figure 1:
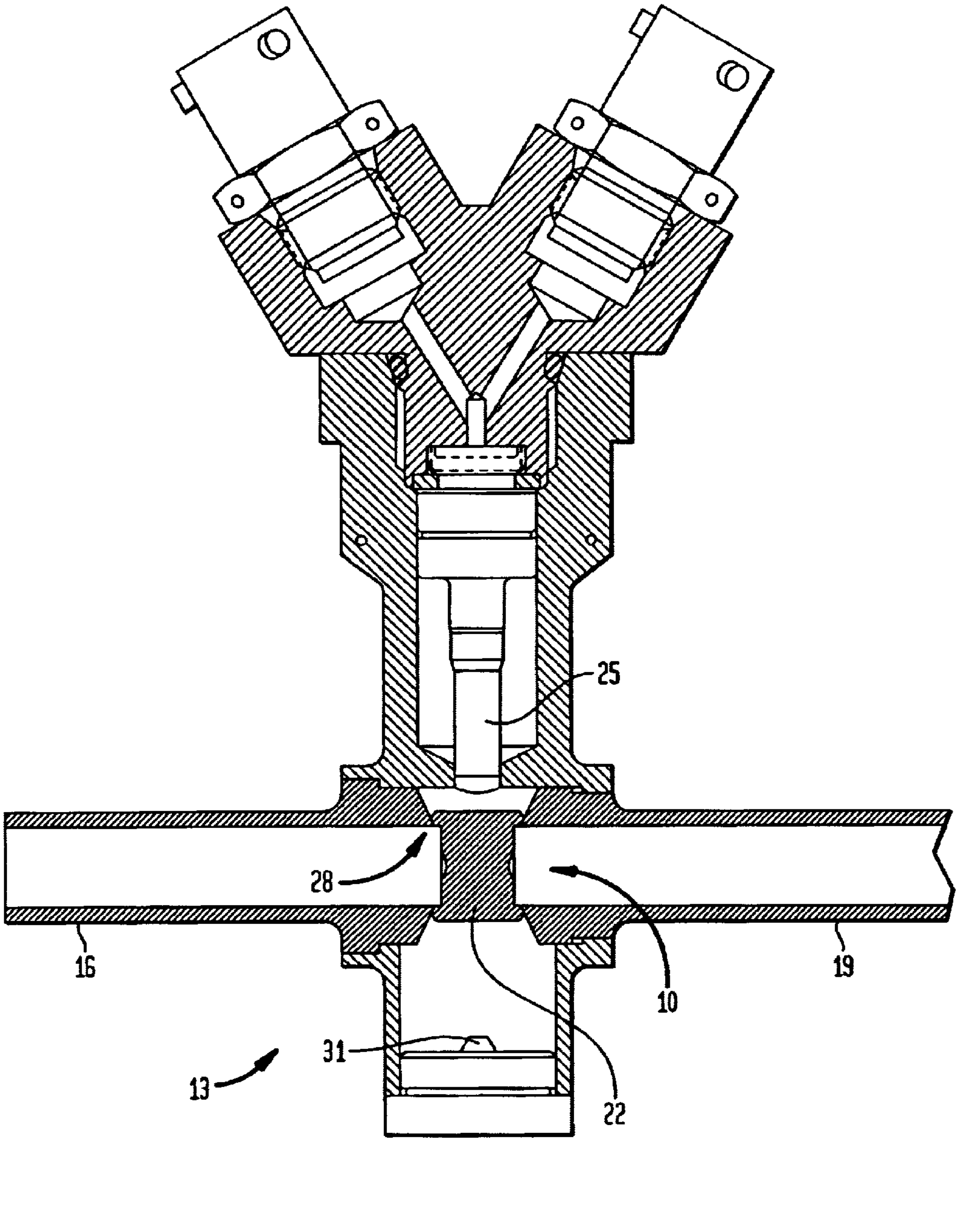
FIG. 1 is a cross-sectional, side elevation view of a prior art pyrovalve.
Figure 3:
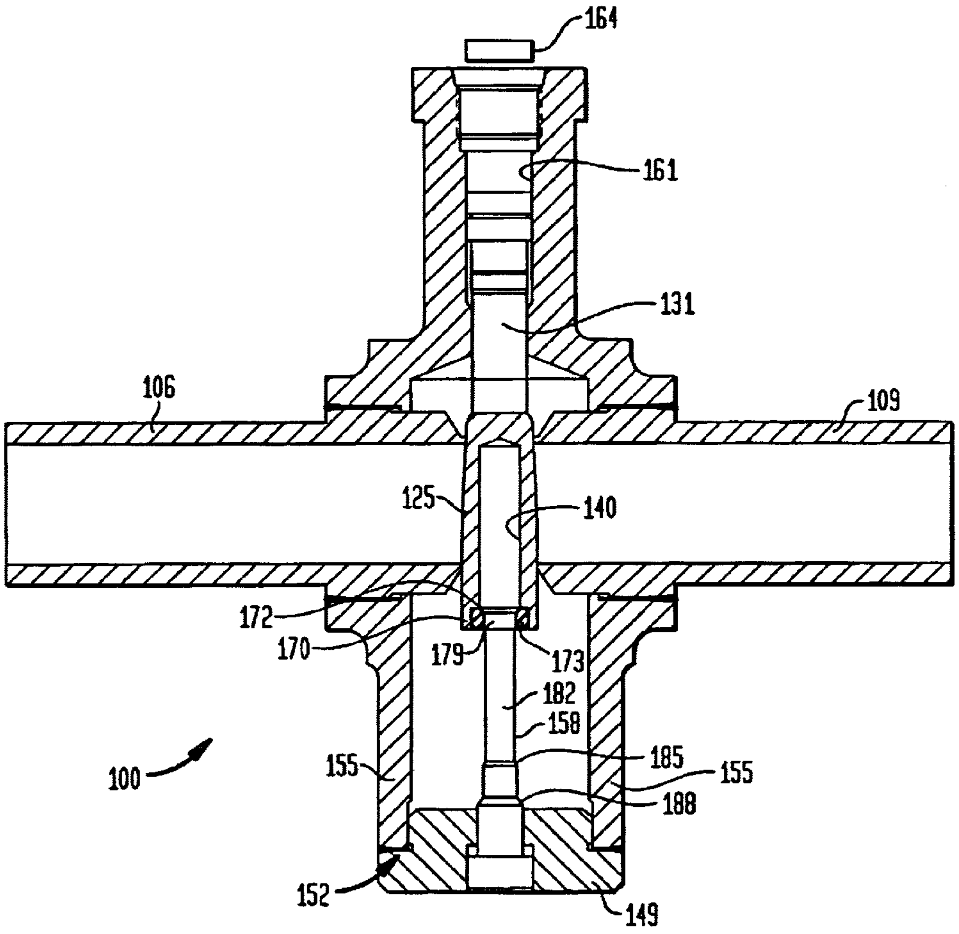
FIG. 3 is a cross-sectional, side elevation view of the pyrovalve of the present invention at the position where the ram makes initial contact with the slug.

Turning to FIG. 3, the valve body 103 includes a central bore 161. A combustion chamber 164 is disposed in operative relationship with the ram 131. When an explosive material is ignited in the combustion chamber 164, the force of the explosion causes the ram 131 to move downward with respect to the orientation of FIG. 3. An example of the portion of the device pertaining to the interface between the combustion chamber and the ram is shown in FIG. 1. This interface is known to those of ordinary skill in the art and therefore is not described in detail herein.

As shown in FIG. 3, the explosion has occurred and the ram 131 has moved downward to the point where the ram 131 engages with the first end 128 of the slug 125.

At the opposite end, the deceleration post 158 is engaged with the opening at the bottom of the slug 125 in order to control the slug 125 and its deceleration. As shown, the end of the slug 125 may include a flange 170 created around a shoulder 172 inside the end of the slug 125. A secondary press fit lock 173 in the form of a ring seated against the shoulder 172 and engaging with the head 179 of the deceleration post 158 is shown.

The deceleration post 158 may include the over-sized head 179 connected to a shaft 182 which terminates in a first shoulder 185 and a second shoulder 188. The first shoulder 185 is wider than the shaft 182 and the second shoulder 188 is wider than the first shoulder 185.

Returning to FIG. 2, the head 179 of the deceleration post 158 is engaged with the opening in the slug 125 and is in tight contact with the press fit lock 173 prior to the firing of the valve 100.

Figure 4:
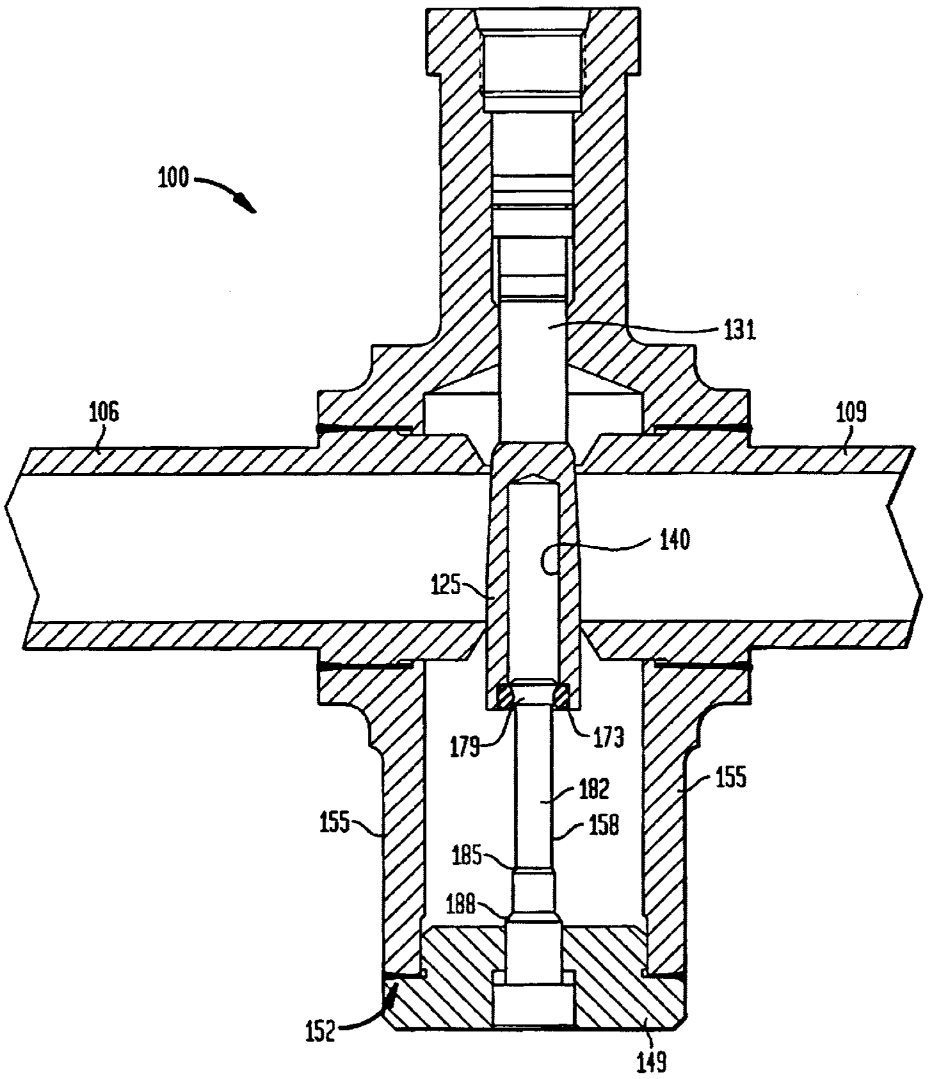
FIG. 4 is a cross-sectional, side elevation view of the pyrovalve of the present invention illustrating the engagement of the slug with the deceleration post.

Turning to FIG. 4, the valve 100 of the present invention is shown at the position where the force of the ram 131 against the slug 125 has caused the slug 125 to slide down over the head 179 of the deceleration post 158 such that the head 179 of the deceleration post 158 enter the bore 140 of the slug 125.

The ram 131 travels in a direction opposite to the direction that the slug 125 was originally press fit into the opening 122. Accordingly, the frictional resistance decreases as the ram 131 moves down. The deceleration post 158 contains the deceleration and captures the slug 125 so that it does not rebound into the opening 122.

Figure 5:
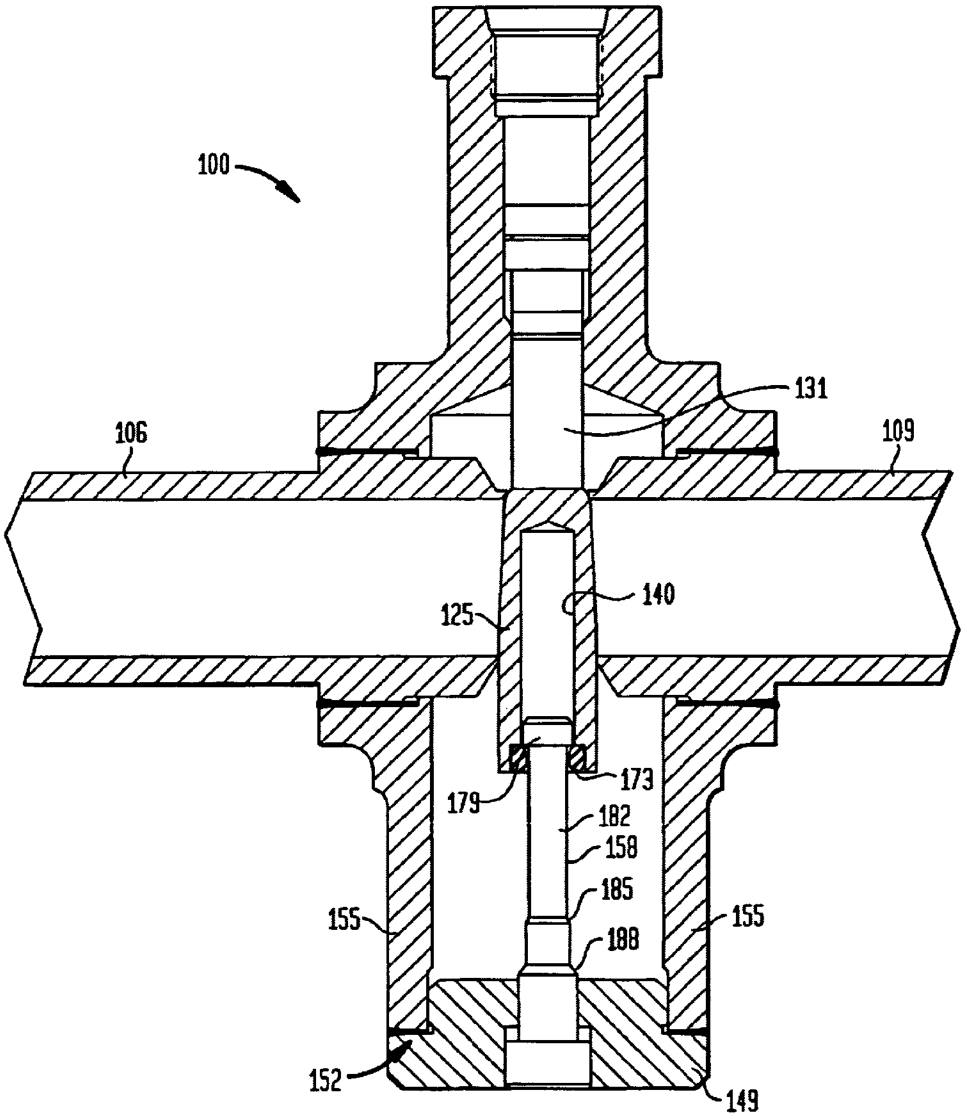
FIG. 5 is a cross-sectional, side elevation view of the pyrovalve of the present invention illustrating the progression of the slug onto the deceleration post.

Turning to FIG. 5, the head 179 of the deceleration post 158 is clear of the sides of the bore 140 after it passes through engagement with the press fit lock 173.

Figure 6:
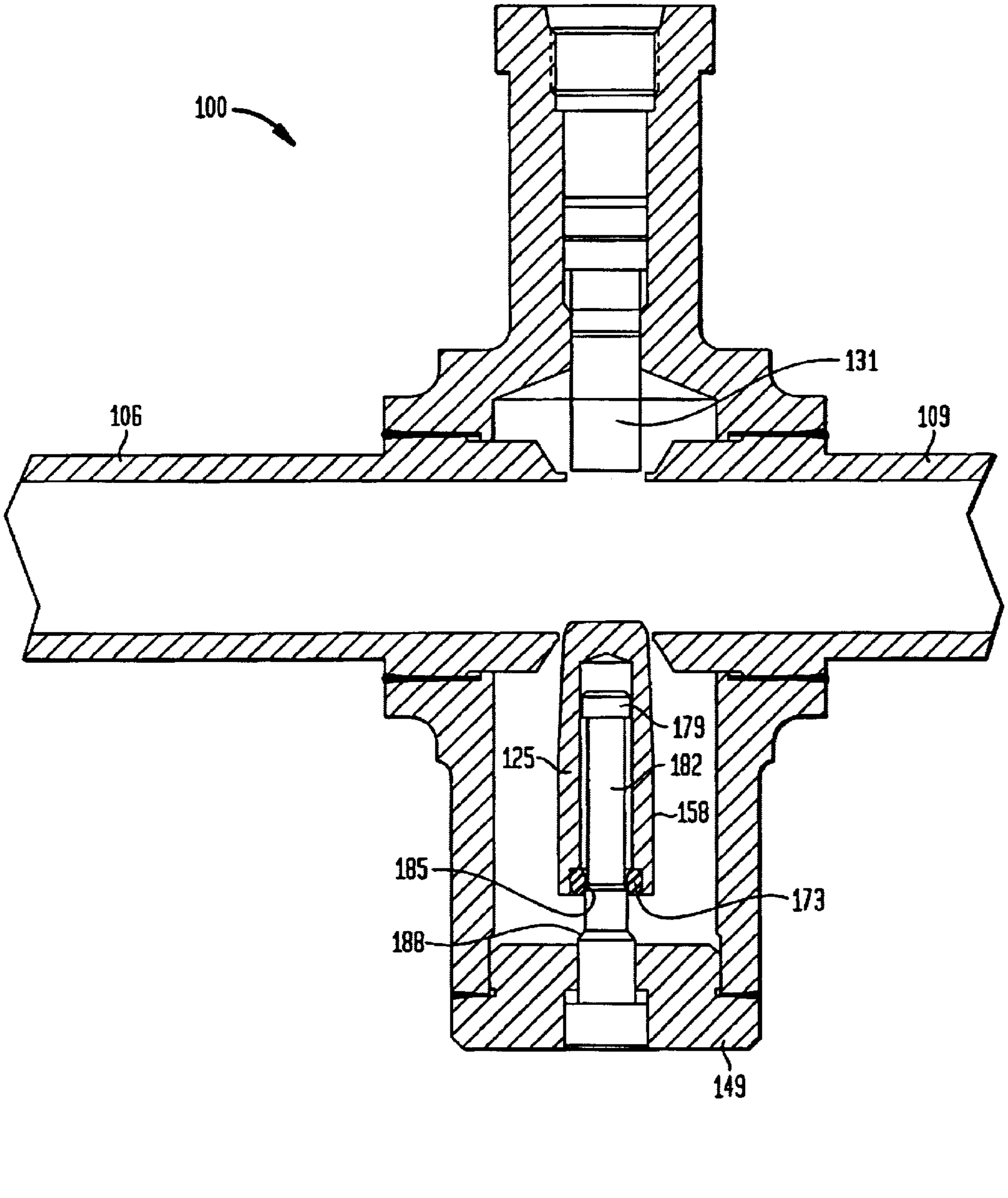
FIG. 6 is a cross-sectional, side elevation view of the pyrovalve of the present invention illustrating the slug at the deceleration shoulder of the deceleration post; and, FIG. 7 is a cross-sectional, side elevation view of the pyrovalve of the present invention illustrating the ram at its maximum stroke and the slug at its maximum stop position.

In FIG. 6, the slug has been displaced from the opening and the press fit lock 173 is engaging with the first shoulder 185 on the deceleration post 158.

Figure 7:
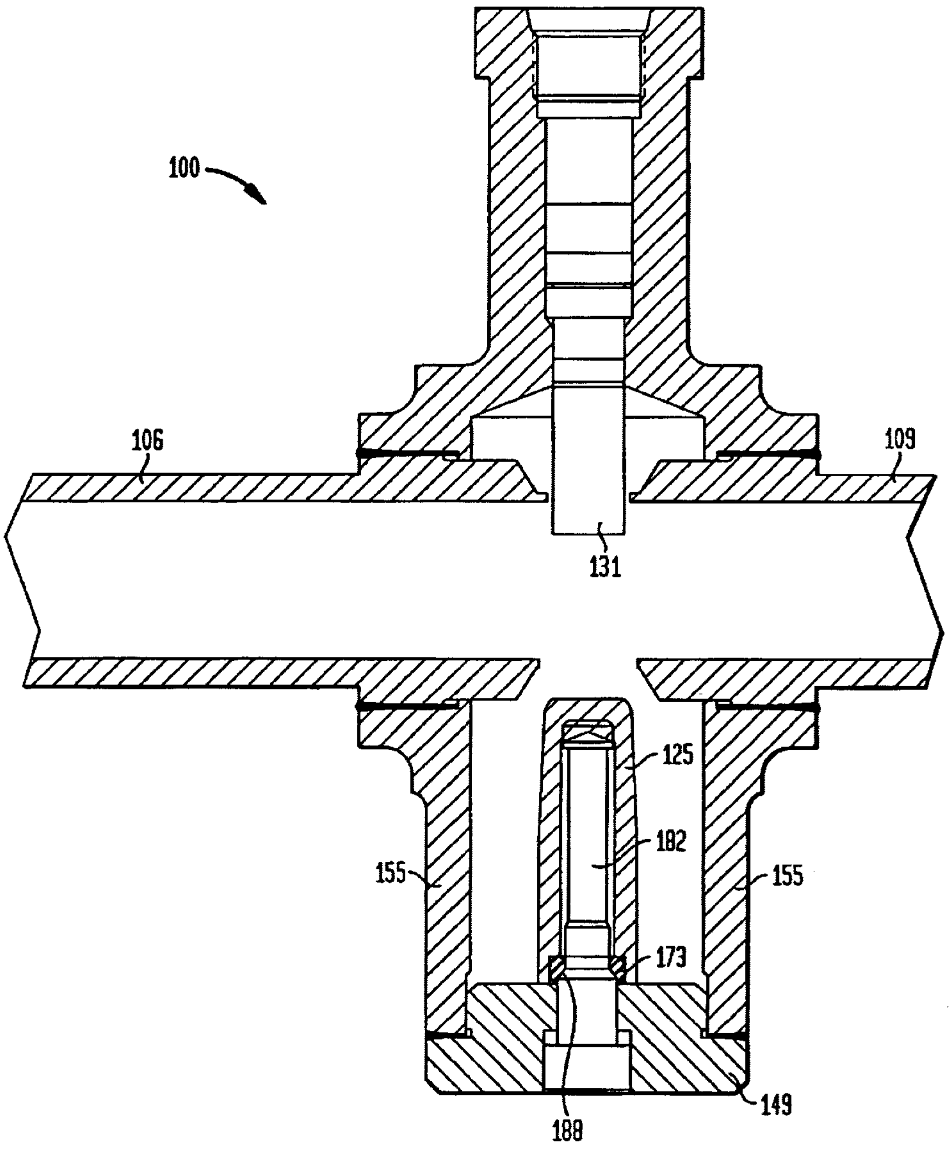

Turning to FIG. 7, the ram 131 is shown at its maximum downward stroke position, and the slug 125 is shown at its maximum stop position. The opening at the end of the slug 125 is engaged with the second shoulder 188 on the deceleration post 158. Accordingly, the deceleration post 158 controls the slug 125 movements and prevents it from rebounding.

While the invention has been described in connection with certain embodiments, it is not intended to limit the scope of the invention to the particular forms set forth, but, on the contrary, it is intended to cover such alternatives, modifications, and equivalents as may be included within the spirit and scope of the invention as defined by the appended claims.

What is claimed is:

1. A pyrovalve, comprising:

a first tubing section;

a second tubing section disposed in spaced-apart relation such that a conveying path between the first and second tubing section is established;

an opening disposed between the first and second tubing sections;

a valve body fixedly attached to the first and second tubing sections, the valve body having a bore;

a ram disposed inside the bore of the valve body;

a slug disposed in the opening between the first tubing section and the second tubing section, the slug being held in position by a frictional fit; and, a combustion chamber disposed in operative relation to the ram such that when an explosive material is ignited the pressure inside the chamber causes the ram to move through the bore to strike the slug and to displace it from the opening between the first and second tubing sections such that the valve is opened.

2. The pyrovalve of claim 1, wherein the slug has a bore disposed therein.

3. The pyrovalve of claim 2, wherein the valve body further comprises a deceleration post.

4. The pyrovalve of claim 1, wherein the slug is press fit into the opening between the tubing sections.

5. The pyrovalve of claim 1, wherein the slug has an outer wall that is angled so that the slug is capable of being mechanically pressed into the opening to produce a frictional fit.

6. The pyrovalve of claim 1, wherein the valve body has an opening on a side of the slug opposite from the ram.

7. The pyrovalve of claim 6, wherein a plug capable of supporting a deceleration post is attached to the opening in the valve body.

8. A pyrovalve, comprising:

a first tubing section;

a second tubing section disposed in spaced-apart relation such that a conveying path between the first and second tubing section is established;

an opening disposed between the first and second tubing sections;

a valve body fixedly attached to the first and second tubing sections, the valve body having a bore, the valve body further comprising a deceleration post;

a ram disposed inside the bore of the valve body;

a slug disposed in the opening between the first tubing section and the second tubing section, the slug having a bore disposed therein, the slug being held in position by a frictional fit;

a combustion chamber disposed in operative relation to the ram such that when an explosive material is ignited the pressure inside the chamber causes the ram to move through the bore to strike the slug and to displace it from the opening between the first and second tubing sections such that the valve is opened; and, wherein the deceleration post engages with the bore of the slug such that the slug is captured after the ram displaces it from the opening between the first and second tubing sections.

9. A pyrovalve, comprising:

a first tubing section;

a second tubing section disposed in spaced-apart relation to the first tubing section such that an opening between the first and second tubing sections is established and such that a conveying path between the first and second tubing sections is established;

a valve body having a bore defined therein and being attached to the first and second tubing sections, such that the first and second tubing sections are maintained in spaced apart relation such that an opening is formed there between;

a ram disposed in the bore in the valve body;

a slug disposed in the opening between the first and second tubing sections and having a bore disposed therein;

a combustion chamber disposed in operative relation to the ram such that when an explosive material is ignited the pressure inside the chamber causes the ram to move through the bore to strike the slug and to displace it from the opening between the first and second tubing sections such that the valve is opened; and, a deceleration post mounted on the valve body on the side of the slug opposite from the ram, the deceleration post adapted to engage with the bore in the slug.

10. The pyrovalve of claim 9, wherein the slug is press fit into the opening between the tubing sections.

11. The pyrovalve of claim 9, wherein the slug has an outer wall that is angled so that the slug is capable of being mechanically pressed into the opening to produce a frictional fit.

12. The pyrovalve of claim 9, wherein the valve body has an opening on a side of the slug opposite from the ram.

13. The pyrovalve of claim 12, wherein a plug capable of supporting a deceleration post is attached to the opening in the valve body.

14. A pyrovalve, comprising:

a first tubing section;

a second tubing section disposed in spaced apart relation to the first tubing section;

a valve body fixedly attached to the first and second tubing sections and having an opening disposed between the first and second tubing sections, the valve body having a bore disposed therein, the valve body further comprising a deceleration post;

means for blocking the opening such that fluid communication between the first tubing section and the second tubing section is prevented;

a ram disposed in the bore in the valve body;

means for driving the ram such that the ram moves through the bore to strike the blocking means and to displace it from the opening between the first and second tubing sections such that the valve is opened; and, wherein the blocking means comprises a slug having a bore disposed therein and wherein the deceleration post engages with the bore of the slug such that the slug is captured after the ram displaces it from the opening between the first and second tubing sections.

15. The pyrovalve of claim 14, wherein the blocking means comprises a slug, the slug is press fit into the opening between the tubing sections.

16. The pyrovalve of claim 14, wherein the blocking means comprises a slug, the slug has an outer wall that is angled so that the slug is capable of being mechanically pressed into the opening to produce a frictional fit.

17. The pyrovalve of claim 14, wherein the blocking means comprises a slug and the valve body has an opening on a side of the slug opposite from the ram.

18. The pyrovalve of claim 17, wherein a plug capable of supporting a deceleration post is attached to the opening in the valve body.

19. A method for actuating a valve, comprising:

providing a first tubing section, a second tubing section disposed in spaced-apart relation such that a conveying path between the first and second tubing section is established; an opening disposed between the first and second tubing sections; a valve body fixedly attached to the first and second tubing sections, the valve body having a bore; a ram disposed inside the bore of the valve body; a slug disposed in the opening between the first tubing section and the second tubing section, the slug being held in position by a frictional fit; a combustion chamber disposed in operative relation to the ram such that when an explosive material is ignited the pressure inside the chamber causes the ram to move through the bore to strike the slug and to displace it from the opening between the first and second tubing sections such that the valve is opened; and, providing ignition to the combustion chamber such that the ram is fired into the slug.

* * * * *